United States Patent [19]

Speca et al.

[11] Patent Number: 5,688,734
[45] Date of Patent: Nov. 18, 1997

[54] METHOD FOR PRODUCING PREPOLYMERIZED, SUPPORTED METALLOCENE CATALYST SYSTEMS

[75] Inventors: Anthony Nicholas Speca, Kingwood; Kelly Tormaschy, Houston, both of Tex.

[73] Assignees: Exxon Chemical Patents Inc., Houston, Tex.; Hoechst Aktiengesellschaft, Germany

[21] Appl. No.: 710,589

[22] Filed: Sep. 19, 1996

Related U.S. Application Data

[63] Continuation of Ser. No. 499,054, Jul. 6, 1995, abandoned.
[51] Int. Cl.$^6$ .............................. C08F 4/656; C08F 10/00
[52] U.S. Cl. .......................... 502/108; 502/120; 526/129; 526/905; 526/943
[58] Field of Search ....................... 502/104, 108

[56] References Cited

U.S. PATENT DOCUMENTS

| | | |
|---|---|---|
| 5,239,022 | 8/1993 | Winter et al. ............... 526/127 |
| 5,240,894 | 8/1993 | Burkhardt et al. . |
| 5,243,001 | 9/1993 | Winter et al. ............... 526/127 |
| 5,332,706 | 7/1994 | Nowlin et al. . |
| 5,468,702 | 11/1995 | Tejelowo ................... 526/124 |

FOREIGN PATENT DOCUMENTS

| | | |
|---|---|---|
| 0279863B1 | 10/1992 | European Pat. Off. . |
| 279863 | 10/1992 | European Pat. Off. . |
| 0629631A2 | 12/1994 | European Pat. Off. . |
| WO 94 28034 | 8/1994 | WIPO . |

*Primary Examiner*—Edward J. Smith
*Attorney, Agent, or Firm*—Paige Schmidt

[57] ABSTRACT

The invention relates to a supported, prepolymerized metallocene catalyst system as well as its production and use in olefin polymerization. The method for producing the prepolymerized catalyst system involves prepolymerizing a metallocene catalyst system containing a volume of solution that is the equivalent of or less than the total pore volume of the supported catalyst system.

16 Claims, No Drawings

METHOD FOR PRODUCING PREPOLYMERIZED, SUPPORTED METALLOCENE CATALYST SYSTEMS

This is a continuation of application Ser. No. 08/499,054, filed Jul. 6, 1995, now abandoned.

FIELD OF THE INVENTION

This invention relates generally to the use and production of a prepolymerized, supported metallocene catalyst system. This invention specifically relates to a gas-phase prepolymerization method wherein the supported catalyst system contains a specific amount of liquid upon prepolymerization. Preferably, this amount of liquid is equal to or less than the total pore volume of the supported catalyst system. When the resulting catalyst system is used to polymerize olefins, fouling is reduced or eliminated and polymer morphology is improved.

BACKGROUND

Fouling has long been a major problem associated with polymerization using many alumoxane activated metallocene catalyst systems. Fouling occurs when polymer particles adhere to the walls and mechanical parts of a polymerization reactor. This results in a number of serious problems detrimental to the polymerization process and to the production of polymer having good particle morphology and bulk density.

A number of various modifications to the metallocene catalyst system have been reported to reduce reactor fouling and/or improve polymer product morphology. Supporting the catalyst system components on a porous carrier and/or prepolymerization of the catalyst system are two such methods. For example, U.S. Pat. No. 5,240,894 discloses that polymer bulk density is improved when the metallocene/alumoxane reaction product is supported on a porous carrier and optionally prepolymerized. U.S. Pat. No. 5,332,706 describes an incipient impregnation technique for the support of alumoxane.

Generally it is thought that prepolymerization reduces fouling by preventing fracture of the supported catalyst system particle. Fracture of the particle is thought to lead to the formation of fines which form deposits on the reactor that lead to fouling. During prepolymerization, a protective shell of polymer is formed primarily around the outside of the particle which is thought to prevent fracture. It is also thought that this protective shell prevents disassociation of catalysts system components, particularly alumoxane, which otherwise would migrate to reactor surfaces and initiate polymer build-up. In addition, prepolymerization reduces the early catalyst activity rate constant thereby avoiding early overheating by creating a diffusion barrier between the active site and monomer.

Unfortunately, prepolymerization does not always prevent fouling or ensure desirable polymer morphology perhaps due to variations in catalyst system components and/or in polymerization conditions. In addition, prepolymerization is expensive on a commercial scale due in part to the need for additional reactor hardware, solvents, and monomer.

The present inventor has found that fouling can be substantially reduced or essentially eliminated and particle morphology improved by using a supported metallocene catalyst system that has been prepolymerized under specific prepolymerization conditions. The method of this invention has the added benefit of producing a prepolymerized, supported catalyst system while using a minimal amount of monomer and solvent during prepolymerization.

SUMMARY

Generally three components comprise the catalyst system of this invention: metallocene, alkylalumoxane, and support material. The metallocenes are transition metal compounds including mono, di, or tri cyclopentadienyl radical systems or derivatives thereof. The alkylalumoxane may exist in the form of linear or cyclic polymers with the simplest compounds being a tetraalkylalumoxane such as tetramethylalumoxane or tetraethylalumoxane. The support material may be organic or inorganic or a mixture thereof. Preferred carriers are porous inorganic oxides such as metal oxides, particularly silica, alumina, silica-alumina, and mixtures therof. Magnesia, titania, zirconia and finely divided polyolefins, for example, may also be used.

This invention specifically relates to a method for forming a prepolymerized supported metallocene catalyst system, said method comprising the step of: prepolymerizing a supported metallocene catalyst system in the presence of olefin monomer wherein the supported catalyst system prior to prepolymerization contains an amount of liquid that is equal to or less than the total pore volume of the supported catalyst system.

In another embodiment, this invention relates to a method for forming a prepolymerized supported metallocene catalyst system, said method comprising the steps of: (a) contacting a dry, supported metallocene catalyst system with a volume of hydrocarbon solution wherein the volume of hydrocarbon solution is equal to or less than one times the total pore volume of the supported catalyst system; then (b) prepolymerizing the resulting catalyst system using one or more gaseous olefin monomers each having from 2 to about 20 carbon atoms. This invention also includes the prepolymerized, supported catalyst system produced by the methods described above as well as use of the catalyst system in an olefin polymerization process.

DETAILED DESCRIPTION OF PREFERRED EMBODIMENTS

Any metallocene may be used in the present invention. Metallocenes are generally represented by the formula

wherein Cp is a cyclopentadienyl ring or derivative thereof, M is a Group 4, 5,or 6 transition metal, R is a hydrocarbyl group or hydrocarboxy group having from 1 to 20 carbon atoms, X is a halogen, and m=1–3, n=0–3, q=0–3, and the sum of m+n+q is equal to the oxidation state of the transition metal. The metallocene may be bridged or unbridged, and include heteroatoms in the structure. Examples of metallocenes are discussed in for example, U.S. Pat. Nos. 4,530, 914; 4,871,705; 4,937,299; 5,124,418; 5,017,714; 5,120, 867; 5,278,119; 5,304,614; 5,324,800; 5,347,025; 5,350, 723; 5,391,790; and 5,391,789; EP-A-0 591 756; EP-A-0 520 732; EP-A-0 420 436; WO 91/04257; WO 93/08221; WO 93/08199; and WO 94/01471 each incorporated fully herein by reference.

Particularly preferred metallocene components employed in the present invention comprise a Group 4, 5, or 6 transition metal, biscyclopentadienyl derivative, preferably bis-indenyl metallocene components having the following general structure:

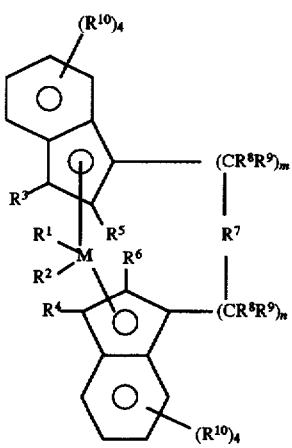

wherein $M^1$ is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium;

$R^1$ and $R^2$ are identical or different, are one of a hydrogen atom a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ -arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

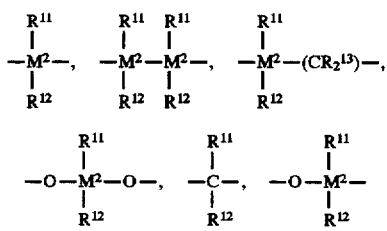

$=BR^{11}, =AlR^{11}$, —Ge—, —Sn—, —O—, —S—, $=SO, =SO_2, =NR^{11}, =CO, PR^{11}$, or $=P(O)R^{11}$;

wherein:

$R^{11}, R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

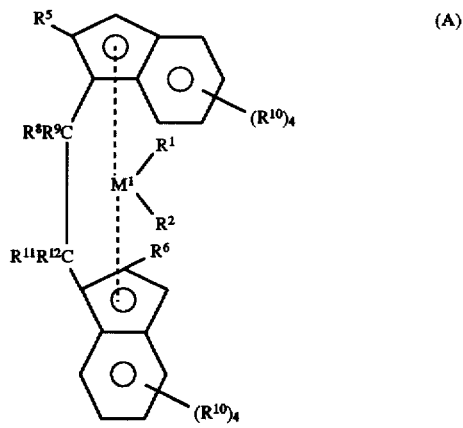

(A)

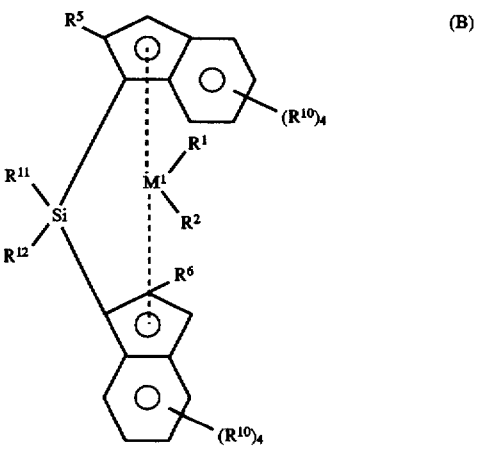

(B)

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

The chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

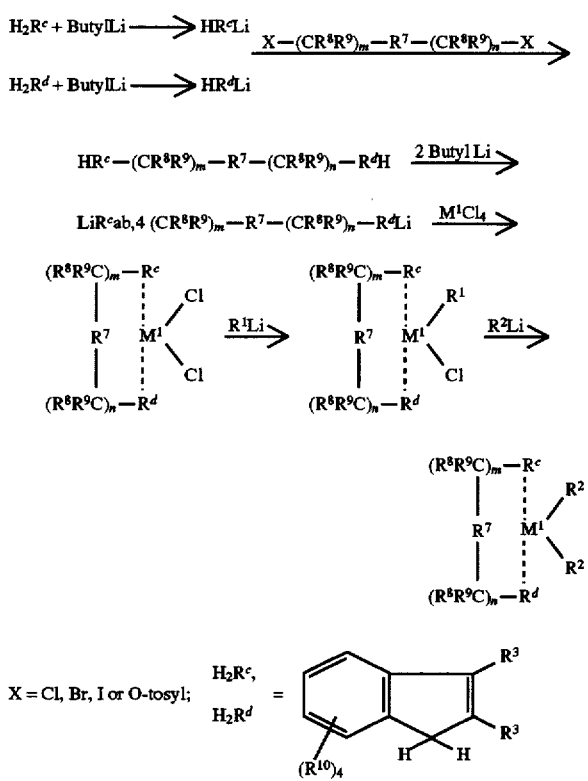

Additional methods for preparing metallocenes of the present invention are fully described in the Journal of Organometallic Chem., volume 288, (1958), pages 63–67, and in EP-A-320762, for preparation of the metallocenes described, both of which are herein fully incorporated by reference.

Illustrative but non-limiting examples of metallocenes include:
Dimethylsilandiylbis(2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl)ZrCl$_2$;
Dimethylsilandiylbis(2-ethyl-4-phenyl-1-indenyl)ZrCl$_2$;
Dimethylsilandiylbis(2-ethyl-4-naphthyl-1-indenyl)ZrCl$_2$,
Phenyl(Methyl)silandiylbis(2-methyl-4-phenyl-1-indenyl)ZrCl$_2$,
Dimethylsilandiylbis(2-methyl-4-(1-naphthyl)-1-indenyl)ZrCl$_2$,
Dimethylsilandiylbis(2-methyl-4-(2-naphthyl)-1-indenyl)ZrCl$_2$,
Dimethylsilandiylbis(2-methyl-indenyl)ZrCl$_2$,
Dimethylsilandiylbis(2-methyl-4,5-diisopropyl-1-indenyl)ZrCl$_2$,
Dimethylsilandiylbis(2,4,6-trimethyl-1-indenyl)ZrCl$_2$,
Phenyl(Methyl)silandiylbis(2-methyl-4,6-diisopropyl-1-indenyl)ZrCl$_2$,
1,2-Ethandiylbis(2-methyl-4,6-diisopropyl-1-indenyl)ZrCl$_2$,
1,2-Butandiylbis(2-methyl-4,6-diisopropyl-1-indenyl)ZrCl$_2$,
Dimethylsilandiylbis(2-methyl-4-ethyl-1-indenyl)ZrCl$_2$,
Dimethylsilandiylbis(2-methyl-4-isopropyl-1-indenyl)ZrCl$_2$,
Dimethylsilandiylbis(2-methyl-4-t-butyl-1-indenyl)ZrCl$_2$,
Phenyl(Methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl)ZrCl$_2$,
Phenyl(Methyl)silandiylbis(2-methyl-4,5-benzo-1-indenyl)ZrCl$_2$,
Phenyl(Methyl)silandiylbis(2-methyl-4,5-(methylbenzo)-1-indenyl)ZrCl$_2$,
Phenyl(Methyl)silandiylbis(2-methyl-4,5-(tetramethylbenzo)-1-indenyl)ZrCl$_2$,
Phenyl(Methyl)silandiylbis(2-methyl-a-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(Methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(Methyl)silandiylbis(2-methyl-5-isobutyl-1-indenyl)ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, and the like.

These preferred metallocene catalyst components are described in detail in U.S. Pat. Nos. 5,149,819, 5,243,001, 5,239,022, 5,296,434 and 5,276,208 all of which are herein fully incorporated by reference.

The metallocene is generally activated with an alkylalumoxane. Alkylalumoxanes may exist in the form of linear or cyclic polymers. Generally, the alkylalumoxanes preferred for use in olefin polymerization contain about 5 to 40 of the repeating units:

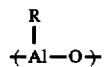

where R is a $C_1$–$C_8$ alkyl including mixed alkyls. Particularly preferred are the compounds where R is methyl. There are a variety of methods for preparing alumoxane, non-limiting examples of which are described in U.S. Pat. No. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each fully incorporated herein by reference.

Some methylalumoxane (MAO) solutions tend to become cloudy and gelatinous over time. It may be advantageous to clarify such solutions prior to use. A number of methods are used to create gel-free MAO solutions or to remove gels from the solutions. Gelled solutions are often simply shaken or decanted. U.S. Pat. No. 5,157,137 discloses a process for forming clear, gel-free solutions of alkylalumoxane by treating a solution of alkylalumoxane with an anhydrous salt and/or hydride of an alkali or alkaline earth metal.

For purposes of this patent specification the term "carrier" and "support" are interchangeable and may be any support material, preferably a porous support material, such as for example, talc, inorganic oxides, inorganic chlorides and resinous support materials such as polyolefin or polymeric compounds or any other organic material that is porous and has an average particle size greater than 10 µm.

The preferred support materials are inorganic oxide materials, which include those from the Periodic Table of Elements of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention have a surface area in the range of from about 10 to about 700 m$^2$/g, pore volume in the range of from about 0.1 to about 4.0 cc/g and average particle size in the range of from about 10 to about 500 µm. More preferably, the surface area is in the range of from about 50 to about 500 m$^2$/g, pore volume of from about 0.5 to about 3.5 cc/g and average particle size of from about 20 to about 200 µm. Most preferably the surface area range is from about 100 to about 400 m$^2$/g, pore volume from about 0.8 to about 3.0 cc/g and average particle size from about 30 to about 100 µm. The pore size of the carrier of the invention typically is in the range of from about 10 to about 1000 Å, preferably about 50 to about 500 Å, and most preferably about 75 to about 350 Å.

The supported catalyst system of this invention can be made in a variety of different ways. The general support technique employed is described in U.S. Pat. No. 5,240,894 (fully incorporated herein by reference). This method involves contacting, in a suitable solvent or other liquid, a metallocene catalyst component as described above with alumoxane or methylalumoxane (MAO) as described above to form a reaction product in solution. The mole ratio of the aluminum of the alumoxane component to the transition metal of the metallocene component is preferably in the range of ratios between about 12:1 to about 800:1, preferably 20:1 to less than 500:1, and most preferably 50:1 to less than 400:1.

For the purposes of this patent specification and appended claims the term "solution" includes a suspension, slurry or other mixture. Any compatible solvent capable of forming a solution or the like with at least one metallocene catalyst component and/or at least one alumoxane of the invention can be used. Non-limiting examples of solvents are those aliphatic, aromatic and saturated hydrocarbons, and cyclic hydrocarbons such as isopentane, heptane, toluene and the like. The more preferred solvents are the cyclic aliphatic and aromatic hydrocarbons, the most preferred of which is toluene.

The reaction product solution is next contacted with the support material such that the millimoles of Al/g support is in the range of from about 0.1 to about 20, preferably from about 0.5 to about 10 and most preferably from about 1 to about 8. The support material preferably has been dehydrated at a temperature ranging of from about 200° C. to about 900° C., preferably from about 400° C. to about 800° C. for about 18-24 hours or until a 3% or less, more preferably 1% or less, loss on ignition value is obtained. It may be preferable to apply the solution containing the catalyst component(s) to the support such that a homogeneous catalyst system is obtained, i.e., wherein the component(s) are evenly distributed on and within the support material particles. In a preferred embodiment, the total volume of solution containing metallocene and activator added to the support is in the range of from less than that volume at which a slurry is formed to above that volume equal to the total pore volume of the support, preferably from 2.5 times the total pore volume of the support to about 1.05 times the total pore volume of the support, more preferaby from about 2.4 to about 1.1 times the total pore volume of the support, even more preferably from about 2.3 to about 1.2 times the total pore volume of the support, even more preferably from about 2.2 to about 1.25 times the total pore volume of the support, even more preferably from about 2.1 to about 1.27 times the total pore volume of the support, even more preferably from about 2.0 to about 1.3 times the total pore volume of the support, and even more preferably from about 2.0 to about 1.5 times the total pore volume of the support. Preferably, the solution is applied either dropwise or as a spray while the support is agitated or otherwise thoroughly mixed.

Generally, a slurry is formed when two phases are observable one of which contains all or most of the support material. The volume of solution required to reach this stage will vary depending upon among other things the type of support material and type of catalyst system components. Just prior to the point at which a slurry is formed, is a stage which is defined herein as the "mud" stage. At the mud stage, the solution volume is such that, while two phases are not visible, the support material is saturated and the support particles are firmly packed together. Prior to the mud stage, the volume of solution is such that the support material appearance ranges from dry and free flowing (even though the support may contain dose to one pore volume of solution) to dry but slightly sticky to variously damp and clumpy such as is the appearance of variously wet sand.

In one embodiment, the volume of solution applied to the support material is below that amount required to form a slurry, preferably from above one pore volume to that required to form a slurry, more preferably from above one pore volume to that required to reach the mud stage. It should be recognized that catalyst systems formed in the mud stage are more difficult to mix and require longer drying times as compared to those prepared with less solution. Below one pore volume it may be difficult to obtain homogeneous coverage of the support material with the catalyst system components. This may lead to fouling.

The total amount of solution may be added to the porous support at one time, or, individual portions of the solution may be added to the porous support such that at any point in time during the formation of the catalyst system the volume of solution is as described above.

The procedure for measuring the total pore volume of a porous support or catalyst system is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration*, Vol. 28, No. 3, Analytical Chemistry 332–334 (March, 1956).

After the metallocene/alumoxane reaction product solution is contacted with the support material, the catalyst system may need to be dried for a period of time sufficient to reduce the amount of solution to a level equal to or less than the pore volume of the supported catalyst, this amount may be in a range of from 0.05 to 0.95 times the total pore volume of the supported catalyst or from 0.5 to 0.9 times the total pore volume of the supported catalyst. Obviously this drying step will not be necessary if the reaction product solution volume is equal to or less than the total pore volume of the support material. The resulting catalyst system should appear dry and free-flowing indicating that the volume of solution remaining in the pores of the catalyst system is equal to or less than the total pore volume of the catalyst system. At this point the catalyst system may be prepolymerized under the conditions described below.

Alternatively, the catalyst system formed from the combination of metallocene/alumoxane reaction product may be dried to remove essentially all of the residual solvent which may be trapped in the pores of the carrier. This results in a free-flowing supported catalyst. The catalyst system of the invention may appear dry but still contain an amount of solvent, for example, toluene. It is preferred, however, that substantially all the solvent is removed. For the purposes of this patent specification and appended claims the term "substantially all of the solvent is removed" means that greater than about 90% of all the solvent is removed from the supported catalyst system upon drying.

If the supported catalyst system is dried to remove essentially all residual solvent, it is next contacted with a volume of hydrocarbon liquid, preferably an aliphatic hydrocarbon. More preferably the aliphatic hydrocarbon is selected from the group consisting of pentane, hexane, heptane, isopentane, propane, butane. The total volume of hydrocarbon liquid added is preferably less than that volume required to form a slurry, more preferably equal to or less than the total pore volume of the dry, supported catalyst system, even more preferably the total volume added is between 0.5 to one times the total pore volume of the dry supported catalyst system, most preferably between 0.7 and 0.95 times the total pore volume of the dry supported catalyst system.

Preferably, the hydrocarbon liquid is added while stirring and/or slowly enough or in small enough aliquotes to prevent localized pooling of the hydrocarbon liquid on the supported catalyst system. After the hydrocarbon liquid is added to the supported catalyst system, the catalyst system should appear mostly dry and free-flowing indicating that the volume of liquid in the pores of the catalyst system is equal to or less than the total pore volume of the supported catalyst system.

Optionally, the supported catalyst system may contain one or more scavengers and/or other additives. Examples of suitable scavenging compounds include triethylaluminum (TEAL), trimethylaluminum (TMAL), tri-isobutylaluminum (TIBAL), tri-n-hexylaluminuim (TNHAL) and the like. The amount of scavenging agent used depends upon the type used as well as the process conditions. Generally, for a scavenging agent such as TEAL 1–500 ppm may be used, preferably, 2–100 ppm, more preferably 5–25 ppm.

The supported metallocene catalyst system containing hydrocarbon liquid within its pores is then prepolymerized. In choosing either the metallocene/alumoxane reaction product solution or the hydrocarbon liquid, it may be important to consider the liklihood of condensation of the solution or liquid once prepolymerization begins. Condensation may occur as polymer is formed which forces liquid out of the pores and into the atmosphere surrounding the supported catalyst system. Depending on various factors, the liquid may condense on the surfaces surrounding the catalyst system and on the catalyst system itself which can lead to clumping of the catalyst system. Those skilled in the art will recognize that this problem may be avoided by adjusting the procedure described above in many various ways such as selecting liquids having an appropriate vapor pressure for the temperature and pressure conditions of the prepolymerization reaction, heating the vessel in which the catalyst system is contained, thorough mixing of the catalyst system during prepolymerization, decreasing the rate of prepolymerization by diluting the monomer feed, using a process wherein the monomer is recycled, condensing the entrained liquid vapor etc.

The prepolymerization conditions may vary widely. Any monomer or combination of monomers may be used as long as the monomer(s) are gaseous at the time they are contacted with the supported catalyst system. Preferably the olefin monomer(s) is selected from the group having from 2 to about 20 carbon atoms, even more preferably ethylene, propylene, and butene, most preferably propylene. Preferably the catalyst system is exposed to the monomer gas while mixing at ambient temperature and pressure, however, temperatures in the range of from 5° C. to 50° C., preferably 10° C. to 30° C. and pressures in the range of about 1 atm. to about 5 atm. can be used so long as the monomer remains gaseous upon initial contact. Preferably, the monomer is fed on demand. In other words, a supply of gaseous monomer is made available to the reaction to be consumed as required. The monomer feed may be diluted with nitrogen or other inert gas in order to control the reaction rate. Hydrogen may also be used during the prepolymerization to control molecular weight of the prepolymer.

While not wishing to be bound by theory, it is believed that the monomer gas dissolves in the aliphatic hydrocarbon liquid present in the pores of the catalyst system and polymerization is initiated at that point. Greater than 90% of the surface area of the catalyst system resides within the pores of the catalyst system. Consequently, by using the method of this invention, the prepolymer forms primarily within the pores of the support material rather than primarily on the surface of the support material.

It has been observed that upon prepolymerization initiation, the catalyst system begins to increase in total weight as polymer forms, however, after a period of time this weight gain stops and partially reverses. It is believed that at this point, the aliphatic hydrocarbon has largely been displaced by polymer formed within the support material pores. Polymerization is preferably stopped at this point. The prepolymerization, however, may be conducted for a time period of from about 1 minute to about 10 hours, preferably from about 10 minutes to about 8 hours, more preferably from about 20 minutes to about 7 hours, even more preferably from about 30 minutes to about 5 hours.

POLYMERIZATION PROCESS OF THE INVENTION

The catalyst system of this invention is suited for the polymerization of any monomers and optionally comonomers in any process, gas, slurry or solution phase or high pressure autoclave process. (As used herein, unless differentiated, "polymerization" includes copolymerization and "monomer" includes comonomer.) In a preferred embodiment a gas phase or slurry phase process is utilized, most preferably a bulk liquid propylene polymerization process is used.

In the preferred embodiment, this invention is directed toward the bulk liquid polymerization and copolymerization of propylene or ethylene, particularly propylene, in a slurry or gas phase polymerization process, particularly a slurry polymerization process. Another embodiment involves copolymerization reactions of propylene or ethylene, particularly propylene, with one or more of the alpha-olefin monomers having from 4 to 20 carbon atoms, preferably 4–12 carbon atoms, for example alpha-olefin comonomers of ethylene, butene-1, pentene-1, 4-methylpentene-1, hexene-1, octene-1, decene-1, and cyclic olefins such as styrene, cyclopentene or norbornene. Other monomers include polar vinyl, diolefins such as dienes, like 1,3-butadiene, 1,4-hexadiene, norbornadiene or vinylnorbornene, acetylene and aldehyde monomers. The invention is particularly well suited to polymerization reactions involving propylene.

In another embodiment ethylene or propylene is polymerized with at least two different comonomers to form a terpolymer and the like, the preferred comonomers are a combination of alpha-olefin monomers having 3 to 10 carbon atoms, more preferably 3 to 8 carbon atoms, and/or dienes having 4 to 10 carbon atoms.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399, 4,588,790, 5,028,670 and 5,352,749 and U.S. application Ser. No. 216,520, filed Mar. 22, 1994, U.S. application Ser. No. 08/306,055 filed Sep. 14, 1994 and U.S. application Ser. No. 08/317,136, filed Oct. 3, 1994 all of which are fully incorporated herein by reference.)

A preferred process is a gas phase polymerization process operating in a condensed mode. For the purposes of this patent specification and appended claims the process of purposefully introducing a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

A slurry polymerization process generally uses pressures in the range of about 1 to about 500 atmospheres or even greater and temperatures in the range of –60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid under the conditions of polymerization and relatively inert. Non-limiting examples of liquid mediums include hexane and isobutane.

The polymers and copolymers made by the process of the invention are useful in forming operations such as, for example, film, sheet, and fiber extrusion and co-extrusion as well as blow molding, injection molding, sheet thermoforming and rotational molding. Films include blown or cast films in mono-layer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. Extruded articles include, for example, medical tubing, wire and cable coatings, geomembranes, and pond liners. Molded articles include single and multi-layered constructions in the form of bottles, tanks, large hollow articles, rigid food containers and toys, etc.

EXPERIMENTAL

All prepolymerizations were carried out in nitrogen purged dry boxes. All solvents were purchased from commerical sources and were nitrogen purged or distilled and dried over activated molecular sieves. Aluminum alkyls were purchased as 10–30 wt % solutions as indicated below.

DESCRIPTION OF MEASUREMENTS

Average Particle Size (APS)—the mean size of the polymer particle distribution as measured according to ASTM D 1921-87 (Method A).

Percentage Greater Than 2 mm—the percentage of the polymer sample retained on a 2 mm Sieve according to ASTM D 1921-87 (Method B).

Polymer Weight Percent Hexene—the amount of Hexene incorporated in the Propylene backbone as measured by C-13 NMR or Fourier Transform Infrared Spectroscopy.

Polymer Melting Point—using a Differential Scanning Calorimetry at a scanning rate of 10° C. per minute, the polymer sample (5–6 mg) is heated above the melting point, cooled below the freezing point then reheated. The second melting point is reported.

PREPARATION OF CATALYST A

MS948 silica (Davison Chemical Davison, W. R. Grace & Co.-Conn.) was dehydrated at 600° C. in flowing $N_2$ to reduce the volatiles content to 0.38% weight loss at 1000° C. after 24 hours. The precursor liquid was prepared by combining 343 grams of 30 wt % Methylalumoxane in toluene (type SAS-L1, Albemarle Corp., Baton Rouge, La.) with 6.38 grams dimethylsilylenebis(2-methyl-4-phenylindenyl) zirconium dichloride and then adding 367 grams of toluene. The precursor was added to 392 grams of the silica while stirring. The damp solid was dried with vacuum over 16 hours while slowly heated to 50° C. The result was 485.5 grams free flowing solid having 7.37 percent Al and 0.09 percent Zr. No weight loss occurred when the catalyst was exposed to a slow stream of $N_2$ for 24 hours, indicating that the pores of the catalyst system were liquid free.

PREPARATION OF CATALYST B

In a similar manner a precursor was prepared from 5.05 grams of standard 30 wt % MAO in toluene from Albemarle, 0.065 grams of the above metallocene and 2.20 grams toluene. This was added to 4.00 grams of the MS948 silica and the damp solid was dried with vacuum over 2.6 hours while slowly heated to 50° C. The result was 5.60 grams free flowing solid having 13.43 percent Al and 0.09 percent Zr. No weight loss occurred when the catalyst was exposed to a slow stream of $N_2$ for 24 hours, indicating that the pores of the catalyst system were liquid free.

APPARATUS FOR LABORATORY PREPOLYMERIZATION

A rotary evaporator was placed in a $N_2$ purged dry box. Via a manifold the evaporator could be evacuated and supplied with $N_2$, propylene or a mixture of each at one atmosphere pressure. During prepolymerization the propylene was supplied as needed to maintain one atmosphere pressure or flowed over the catalyst at the desired rate also at one atmosphere pressure. The catalyst for prepolymerization was loaded into a round bottom flask and attached to the evaporator. Rotation of the flask provided slow tumbling of the catalyst.

PREPOLYMERIZATION OF CATALYST A

EXAMPLE 1

To 1.00 grams of Catalyst A was added 0.60 grams hexane in 0.2 gram aliquots with shaking after each addition. A flask containing 1.4765 grams of the finely divided, free flowing solid (0.9228 grams catalyst) was attached to the rotary evaporator which had been evacuated and refilled with propylene. No heat or vacuum was applied to the catalyst during the prepolymerization. After two hours the propylene and hexane were removed under vacuum at 20° C. for one hour then at 40°–50° C. for one hour. Weighing showed a prepolymer ratio of 0.36. Hexane added to the pores of the catalyst increased the rate of prepolymerization fourfold compared to similar conditions with no liquid in the pores as in comparative Example 1.

EXAMPLE 2

To 1.00 grams of Catalyst A was added 0.72 grams hexane all at once. After three minutes shaking, a finely divided, free flowing solid was obtained. A flask containing 1.6485 grams of the solid (0.9584 grams catalyst) was attached to the rotary evaporator which had been evacuated and refilled with propylene. No heat or vacuum was applied to the catalyst during the prepolymerization. Net weights with time were as follows: 0.3159 grams, 1.0 hrs.; 0.3165 grams, 2.0 hrs.; 0.2237 grams, 3.0 hrs. 0.2023 grams, 4.0 hrs. The prepolymerized catalyst was freed of propylene and residual hexane as above. Weighing showed a prepolymer ratio of 0.54. Periodic weighing shows that the hexane evaporated during the prepolymerization. As the pores dried, the rate of prepolymer formation decreased so that the ratio after four hours was not double the ratio after two hours.

EXAMPLE 3

To 1.407 grams of Catalyst A was added 1.15 grams toluene in two parts with shaking after each addition. The catalyst clumped and was no longer free flowing. Under a stream of $N_2$ the amount of toluene was reduced to 1.02 grams and the solid was again free flowing. A flask containing 2.0005 grams of the finely divided, free flowing solid (1.1605 grams catalyst) was attached to the rotary evaporator which had been evacuated and refilled with propylene. Immediately prepolymer began to form as evidenced by the fading of the catalyst color. Shortly afterwards toluene condensed on the walls of the flask and the catalyst clumped. After 20 minutes the prepolymerized catalyst was freed of propylene and residual toluene as above. Weighing showed a prepolymer ratio of 0.27. Some of the prepolymerized catalyst remained on the walls and was not free flowing. The rapid rate of prepolymerization coupled with condensation of toluene and lack of adequate stirring resulted in fouling under the static conditions used for gas phase prepolymerization.

EXAMPLE 4

The procedure of Example 3 was repeated with a free flowing solid made by combining 0.62 grams of Catalyst A and 0.55 grams toluene except the prepolymerization gas was a mixture of 25 parts $N_2$ and 75 parts propylene and the gas was flowed over the solid at a rate of 10–15 cc per minute. No condensation of toluene occurred. After 20 minutes the solid was freed of propylene and residual toluene under vacuum. Weighing showed a prepolymer ratio of 0.37. The result shows that the conditions for gas phase prepolymerization can be adjusted to provide finely divided, free flowing prepolymerized catalyst.

COMPARATIVE EXAMPLE 1

A flask containing 1.9252 grams of Catalyst A was attached to the prepolymerization apparatus and vacuum applied. After several minutes the vacuum was replaced with propylene and the catalyst tumbled at 20° C. under one atmosphere of propylene. After two hours the propylene was removed by vacuum and replaced with $N_2$. Weighing the catalyst showed a gain of 0.1483 grams. The ratio of prepolymer to catalyst was 0.09.

COMPARATIVE EXAMPLE 2

A flask containing 1.4962 grams of Catalyst A was prepolymerized with propylene as above except the catalyst was heated to 50° C. After 2.5 hours the propylene was removed by vacuum and replaced with $N_2$. Weighing the catalyst showed a gain of 0.7240 grams. The ratio of prepolymer to catalyst was 0.48. This example shows that although the rate of prepolymerization with Catalyst A is slow, the rate can be increased by heat.

COMPARATIVE EXAMPLE 3

Catalyst A was treated with propylene liquid under conditions of high temperature and pressure typically used for conventional prepolymerization. Three minutes after the catalyst was injected into the reactor, isopropyl alcohol was added to stop the reaction. The solid was recovered and dried for four hours at 70° C. under vacuum. Prepolymer ratios in the range of 40–50 were obtained for several runs.

The Examples set forth above are compared in Table 1.

PREPOLYMERIZATION OF CATALYST B

COMPARATIVE EXAMPLE 4

A flask containing 1.3600 grams of Catalyst B was attached to the prepolymerization apparatus and vacuum applied. After several minutes the vacuum was replaced with propylene and the catalyst tumbled at 50° C. under one atmosphere of propylene. After 0.75 hours the propylene was removed by vacuum and replaced with $N_2$. Weighing the catalyst showed a gain of 1.0918 grams. The ratio of prepolymer to catalyst was 0.80.

COMPARATIVE EXAMPLE 5

A flask containing 1.3438 grams of Catalyst B was prepolymerized with propylene as above except the catalyst was heated to 50° C. After 2.5 hours the propylene was removed by vacuum and replaced with $N_2$. Weighing the catalyst after 0.75 showed a prepolymer ratio of 0.78. Heating and exposure to propylene for a total of 18 hours resulted in a prepolymer ratio of 1.32.

EXAMPLE 5

To 1.0 grams of Catalyst B was added 0.95 mL hexane in three parts with shaking after each addition. A flask containing 1.50 grams of the finely divided, free flowing solid was attached to the rotary evaporator which had been evacuated and refilled with propylene. Immediately prepolymer began to form followed shortly by condensing hexane which wet the walls of the flask and fouled the catalyst. The prepolymerized catalyst was no longer free flowing and the experiment was stopped.

EXAMPLE 6

Example 5 was repeated except with 0.45 mL hexane added to Catalyst B. The result was the same and the prepolymerization was stopped after 0.25 hours. The ratio of prepolymer to catalyst was 0.36.

EXAMPLE 7

To 0.49 grams of Catalyst B was added 0.29 grams hexane in three parts with shaking after each addition. A flask containing 0.7020 grams of the finely divided, free flowing solid (0.4410 grams catalyst) was attached to the rotary evaporator and exposed to flowing propylene gas at a rate of about 2–3 cc/minute. After 0.5 hours the solid had a net gain of 0.1230 grams and after 1.0 hours 0.1520 grams. Hexane did not condense during the prepolymerization. Propylene and residual hexane were removed under vacuum resulting in a finely divided, free flowing prepolymerized catalyst. The ratio of prepolymer to catalyst was 0.31.

The Examples set forth above are compared in Table 2.

THE POLYMERIZATION TEST

A 2 liter autoclave reactor was flushed with $N_2$ while heating. When cool triethylaluminum (0.25 mL of a 1M solution in hexane), the desired mL of Hexene-1 and the desired mM Hydrogen were charged followed with 1000 mL of propylene. The reactor was heated to a temperature of 60° C. The catalyst sample (0.075 grams bare catalyst) was loaded into an injection tube and slurried in 2 mL of hexane. The catalyst was charged to the reactor with a flush of 200 mL propylene to start the reaction. After 20 minutes the reactor was cooled, vented, purged with $N_2$ and opened. The recovered polymer was permitted to dry in air for at least four hours then dried for a minimum of 2 hours at 75° C. in vacuo. After recovery the dried polymer was weighed and particle size measured.

If prepolymerization in the reactor was desired, the catalyst was charged three minutes prior to the Hexene-1. As shown in Comparative Example 3 and Table 4, prepolymerization in the reactor gave prepolymer ratios of 40–50 for Catalyst A and about 315 for Catalyst B.

DISCUSSION OF PREPOLYMERIZED CATLAYST TESTING

Table 3 shows the results of Catalyst A and prepolymerized Catalyst A testing under polymerization conditions to produce propylene-hexene copolymer. For unprepolymerized catalyst A (bare catalyst) the copolymer was obtained in the form of agglomerated particles with an average particle size of 1564 microns. Single, finely divided copolymer with an APS of 655 microns was obtained when the Catalyst A was prepolymerized in the reactor before the addition of hexene. However, in comparison, the hexene-1 content of the copolymer was lower and the melting point higher than indicating that the ability to incorporate comonomer was diminished. When Catalyst A prepolymerized in the gas phase (Comparative Example 2) was used the average particle size of the copolymer was still larger indicating some agglomeration of individual particles. However, when prepolymerized Catalyst A was used, the averages for the polymer particle sizes were fully equivalent to the bare catalyst prepolymerized in the reactor even though the prepolymer amounts were only about 1% of reactor prepolymerized Catalyst A. Furthermore, the amount of hexene incorporated in the copolymers and the copolymer melting points were fully equivalent to the polymer made with bare catalyst indicating no diminution of hexene incorporation.

Table 4 shows the results of Catalyst B and prepolymerized Catalyst B testing under polymerization conditions to produce propylene-hexene copolymer. Catalyst B is more active than Catalyst A and produced copolymer with more and larger agglomerates. The amount of these agglomerates was characterized by the percentage larger than 2 millimeter. For unprepolymerized Catalyst B the amount was 72%. Using conditions similar to Comparative Example 3, i.e., prepolymerization in liquid propylene, Catalyst B product had 0.1% larger than 2 mm. Catalyst B prepolymerized in the gas phase (Comparative Examples 4 and 5) did not eliminate agglomeration of the product. However, Catalyst B prepolymerized after wetting the pores with hexane did control the formation of agglomerates.

Example 6 shows the importance of maintaining the catalyst system in a finely divided state during prepolymerization. Example 7 shows the prepolymerized catalyst prepared according to the invention controls agglomeriation without sacrificing comonomer incorporation as with other methods of prepolymerization.

TABLE 1

| Example | Pore Liquid | Prepolymerization |  |  |  |  |
|---|---|---|---|---|---|---|
|  |  | $C_3^=$ | T (°C.) | P (atm) | Hours | Ratio |
| Comp. 1 | None | gas | 20 | 1 | 2.0 | 0.09 |
| Comp. 2 | None | gas | 45–50 | 1 | 2.5 | 0.48 |
| 1 | Hexane | gas | 20 | 1 | 2.0 | 0.36 |
| 2 | Hexane | gas | 20 | 1 | 4.0 | 0.54 |
| 3 | Toluene | gas | 20 | 1 | 0.33 | 0.27 |
| 4 | Toluene | gas + $N_2$ | 20 | 1 | 0.33 | 0.37 |
| Comp. 3 | Propylene | liquid | 60 | 38 | 0.05 | 40–50 |

TABLE 2

| Example | Pore Liquid | Prepolymerization |  |  |  |  |
|---|---|---|---|---|---|---|
|  |  | $C_3^=$ | T (°C.) | P (atm) | Hours | Ratio |
| Comp. 4 | None | gas | 50 | 1 | 0.75 | 0.80 |

TABLE 2-continued

| Example | Pore Liquid | Prepolymerization | | | | |
|---|---|---|---|---|---|---|
| | | $C_3^=$ | T (°C.) | P (atm) | Hours | Ratio |
| Comp. 5 | None | gas | 50 | 1 | 18 | 1.32 |
| 5 | Hexane | gas | 20 | 1 | — | — |
| 6 | Hexane | gas | 20 | 1 | 0.25 | 0.36 |
| 7 | Hexane | gas | 20 | 1 | 1.0 | 0.31 |

TABLE 3

| Example | Prepolymer Ratio | PP (g) | $C_6^=$ (wt %) | M. Pt. (°C.) | APS (μm) |
|---|---|---|---|---|---|
| — | None | 43.2 | 3.5 | 127.3 | 1564 |
| Comp. 1 | 0.09 | 24.6 | 3.4 | 128.5 | — |
| Comp. 2 | 0.48 | 37.7 | 3.6 | 128.6 | 808 |
| 1 | 0.36 | 33 | 3.6 | 126.8 | 583 |
| 2 | 0.54 | 47 | 3.6 | 127.5 | 648 |
| Comp. 3 | 40–50 | 45.7 | 2.7 | 131.1 | 655 |

TABLE 4

| Example | Prepolymer Ratio | PP (g) | $C_6^=$ (wt %) | M. Pt. (°C.) | Particles >2 mm |
|---|---|---|---|---|---|
| — | None | 96.5 | 3.8 | 128.6 | 72% |
| Comp. 4 | 0.80 | 100.0 | 3.5 | 128.6 | 35% |
| Comp. 5 | 1.32 | 89.6 | 3.4 | 128.1 | 26% |
| 6 | 0.36 | 33.7 | 2.4 | 134.1 | 0.0% |
| 7 | 0.31 | 55.7 | 3.3 | 126.9 | 0.9% |
| Comp. 3† | 315 | 100.4 | 2.6 | 132.0 | 0.1% |

† Except using Catalyst B. The prepolymer ratio was calculated by comparison to the weight percent hexene for the no prepolymer case.

While the present invention has been described and illustrated by reference to particular embodiments, it will be appreciated by those of ordinary skill in the art that the invention lends itself to variations not illustrated herein. For these reasons, then, reference should be made solely to the appended claims for purposes of determining the true scope of the present invention.

We claim:

1. A method for forming a prepolymerized supported metallocene catalyst system, said method comprising the steps of:

(a) forming a reaction product of metallocene and alkylalumoxane in a hydrocarbon solvent;

(b) contacting a volume of the reaction product with a porous support;

(c) drying the resulting supported catalyst system such that at least 90% of all solvent is removed from the pores of the porous support;

(d) contacting the dried supported catalyst system of step (c) with a volume of hydrocarbon solution wherein the volume is equal to or less than the total pore volume of the porous support;

(e) prepolymerizing the supported catalyst system with gaseous monomer; and (f) recovering prepolymerized supported catalyst system.

2. The method of claim 1 wherein the alkylalumoxane is methylalumoxane.

3. The method of claim 1 wherein the metallocene is represented by the general formula:

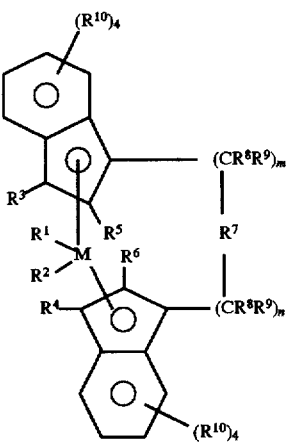

wherein M is a metal of group 4, 5, or 6 of the Periodic Table, $R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_8$–$C_{40}$ arylalkenyl group, or a halogen atom;

$R^3$ and $R^4$ are hydrogen atoms;

$R^5$ and $R^6$ are identical or different, preferably identical, are one of a halogen atom, a $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

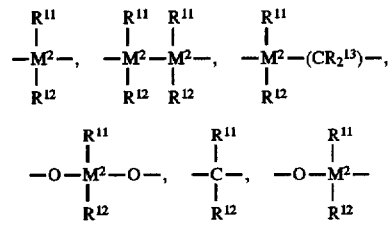

=$BR^{11}$, =$AlR^{11}$, —Ge—, —Sn—, —O—, —S—, =SO, =$SO_2$, =$NR^{11}$, =CO, $PR^{11}$, or =$P(O)R^{11}$;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings as stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ wherein further two adjacent $R^{10}$ radicals can be joined together to form a ring system.

4. The method of claim 1 wherein the metallocene comprises two or more metallocene catalyst components.

5. The method of claim 1 wherein the mole ratio of aluminum of the alkylalumoxane to the transition metal of the metallocene is in the range of between 20:1 to less than 500:1.

6. The method of claim 1 wherein the olefin monomer is selected from the group consisting of ethylene, propylene, and butene.

7. The method of claim 1 wherein the liquid is an aliphatic hydrocarbon selected from the group consisting of pentane, hexane, and heptane.

8. The method of claim 3 wherein m=n=0 and $M^2$=silicon.

9. The method of claim 3 wherein $R^5$=$R^6$=$C_{1-10}$ alkyl.

10. The method of claim 3 wherein three of the $R^{10}$ radicals=hydrogen and one is a $C_{6-30}$ aryl group.

11. The method of claim 3 wherein two adjacent $R^{10}$ radicals form a fused 4,5-benzo ring and the other two $R^{10}$ radicals are hydrogen.

12. The method of claim 3 wherein at least one of the $R^{10}$ radicals is $C_{1-10}$ alkyl.

13. The method of claim 1 wherein the metallocene is selected from the group consisting essentially of:

rac-dimethylsilandiylbis(2-methyl-4,5-benzoindenyl) zirconium dichloride;
rac-dimethylsilandiylbis(2-methylindenyl)zirconium dichloride;
rac-dimethylsilandiylbis(2-methyl-4,6-diisopropylindenyl) zirconium dichloride;
rac-dimethylsilandiylbis(2-methyl-4-phenylindenyl) zirconium dichloride; and
rac-dimethylsilandiylbis(2-ethyl-4-phenylindenyl) zirconium dichloride;
Dimethylsilandiylbis(2,4,6-trimethyl-1-indenyl);
Dimethylsilandiylbis(2-methyl-4-(1-naphthyl)-1-indenyl) zirconium dichloride;
Dimethylsilandiylbis(2-methyl-4-(2-naphthyl)-1-indenyl) zirconium dichloride.

14. The method of claim 1 wherein the volume of reaction product is less than that volume required to form a slurry.

15. The method of claim 1 wherein the metallocene is represented by the formula:

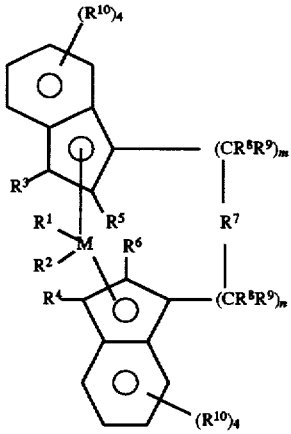

wherein $M^1$ is a metal of group 4, 5, or 6 of the Periodic Table, $R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, preferably identical, are one of a halogen atom, a $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

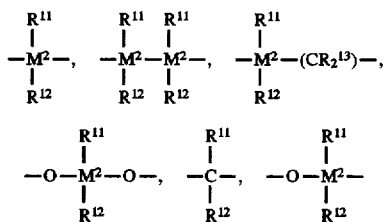

=$BR^{11}$,=$AlR^{11}$, —Ge—, —Sn—, —O—, —S—, =SO, =$SO_2$, =$NR^{11}$, =CO, $PR^{11}$, or =$P(O)R^{11}$;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings as stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ wherein further two adjacent $R^{10}$ radicals can be joined together to form a ring system.

16. The method of claim 1 wherein the hydrocarbon is selected from the group consisting of pentane, hexane, and heptane.

* * * * *